United States Patent
Robison

(10) Patent No.: US 7,478,398 B2
(45) Date of Patent: Jan. 13, 2009

(54) MANAGEMENT APPARATUS AND METHOD FOR DATA COLLECTION INCLUDING ACCUMULATING MESSAGES AND DETERMINING MESSAGE HANDLERS FOR PROCESSING THE ACCUMULATED MESSAGES

(75) Inventor: Terry Robison, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 10/284,367

(22) Filed: Oct. 31, 2002

(65) Prior Publication Data

US 2004/0216131 A1  Oct. 28, 2004

(51) Int. Cl.
G06F 9/44 (2006.01)
G06F 12/00 (2006.01)

(52) U.S. Cl. ........................ 719/313; 707/203

(58) Field of Classification Search ................ 718/104; 719/313–315, 318; 709/201–207, 217–219, 709/223–226; 711/170–173, 111, 112; 707/1–10, 707/205, 203
See application file for complete search history.

(56) References Cited

U.S. PATENT DOCUMENTS

| | | | | |
|---|---|---|---|---|
| 5,404,521 A | * | 4/1995 | Murray | 718/104 |
| 5,796,633 A | * | 8/1998 | Burgess et al. | 702/187 |
| 5,961,596 A | * | 10/1999 | Takubo et al. | 709/224 |
| 5,991,792 A | * | 11/1999 | Nageswaran | 718/102 |
| 6,148,335 A | * | 11/2000 | Haggard et al. | 709/224 |
| 6,226,689 B1 | * | 5/2001 | Shah et al. | 719/314 |
| 6,327,677 B1 | * | 12/2001 | Garg et al. | 714/37 |
| 6,539,435 B2 | * | 3/2003 | Bolmarcich et al. | 719/310 |
| 6,542,920 B1 | * | 4/2003 | Belkin et al. | 718/104 |
| 6,836,888 B1 | * | 12/2004 | Basu et al. | 718/104 |
| 2002/0083420 A1 | * | 6/2002 | Zammit et al. | 717/135 |
| 2002/0171678 A1 | * | 11/2002 | Bandhole et al. | 345/744 |
| 2004/0034856 A1 | * | 2/2004 | Boudnik et al. | 718/103 |
| 2004/0078461 A1 | * | 4/2004 | Bendich et al. | 709/224 |

OTHER PUBLICATIONS

Welsh et al., SEDA: an architecture for well-conditioned, scalable internet services, ACM Symposium on Operating Systems Principles Proceedings of the eighteenth ACM symposium on Operating systems principles, pp. 230-243, 2001.*

Georgiev et al., Assignment schemes for replicated services in Jini, Parallel, Distributed and Network-based Processing, 2002. Proceedings. 10th Euromicro Workshop on, Jan. 9-11, 2002 pp. 129-136.*

* cited by examiner

*Primary Examiner*—Li B Zhen
*Assistant Examiner*—Charles E Anya

(57) ABSTRACT

A management apparatus that enables data collection and processing among one or more hosts and one or more devices by accumulating at least one message from a system, determining what processing the at least one message requires, constructing at least one generic actionhandler to process the at least one message using at least one director and at least one associated builder, and executing the at least one actionhandler to perform a desired action.

30 Claims, 15 Drawing Sheets

FIG. 13

| util::Data |
| --- |
| -values : Map |
| +get(in constant : String) : Object |
| +getBoolean(in constant : String) : boolean |
| +getNumber(in constant : String) : Number |
| +getString(in constant : String) : String |
| +isDefined(in constant : String) : boolean |
| +remove(in constant : String) : boolean |
| +set(in name : String, in value : Object) |
| +set(in name : String, in value : boolean) |
| +set(in name : String, in value : double) |
| +set(in name : String, in value : long) |
| +toString() : String |

MANAGEMENT APPARATUS AND METHOD FOR DATA COLLECTION INCLUDING ACCUMULATING MESSAGES AND DETERMINING MESSAGE HANDLERS FOR PROCESSING THE ACCUMULATED MESSAGES

BACKGROUND OF THE INVENTION

A storage area network (SAN) is a high-speed, high-bandwidth inter-server network utilizing integrated hardware and software to provide a robust, high-speed storage backbone. A SAN enables clusters of servers to share storage with exclusive data access or to share data on common storage devices, depending on the SAN topology. SAN networks are useful, for example, in fully networked enterprises that require storage of terabytes of information collected on each customer and each transaction. The need for high availability and security of data adds to escalating requirements. SANs offer fast, available pools of storage that can be shared throughout an enterprise, yet managed through simplified operations.

SANs include large collections of storage elements, such as multiple hard disk drives, tapes, etc. To ensure performance in known SANs, data and performance metrics are gathered. These metrics are used to determine performance trends and statistics that are used to anticipate possible problems (such as bandwidth bottlenecks) so that measures can be taken to alleviate the problems before they occur.

In a SAN or other storage environment according to the conventional art, it is known to run a storage area manager (SAM) process on a server within the SAN. As its name implies, the SAM, in part, manages the interaction between components of the storage environment as well as interaction of application programs having storage needs (clients) within components of the storage environment.

Conventional SAMs receive events from components of the storage environment and react, but are a fixed size with fixed capability, and static in their operation, namely, when an event is received by a SAM, the SAM knows which functional modules must be called to process any given message in the event and those functional modules must be available or the message must wait.

SUMMARY OF THE INVENTION

In an embodiment, the present invention is directed to a management apparatus that enables data collection and processing among one or more hosts and one or more devices by accumulating at least one message from a system, determining what processing the at least one message requires, constructing at least one generic actionhandler to process the at least one message using at least one director and at least one associated builder, and executing the at least one actionhandler to perform a desired action.

BRIEF DESCRIPTION OF THE DRAWINGS

FIGS. 5-6 are sequence diagrams in accordance with unified modeling language (UML) principles. Messages are depicted with arrows of different styles. A → arrow indicates a message that expects a response message. A ←- - - arrow a response message. A - - - → arrow indicates a message for which the response is implied. And a → arrow indicates a message for which no response is expected.

FIG. 13 illustrates a data structure according to an embodiment of the invention.

DETAILED DESCRIPTION OF THE EMBODIMENTS

Figure 1:
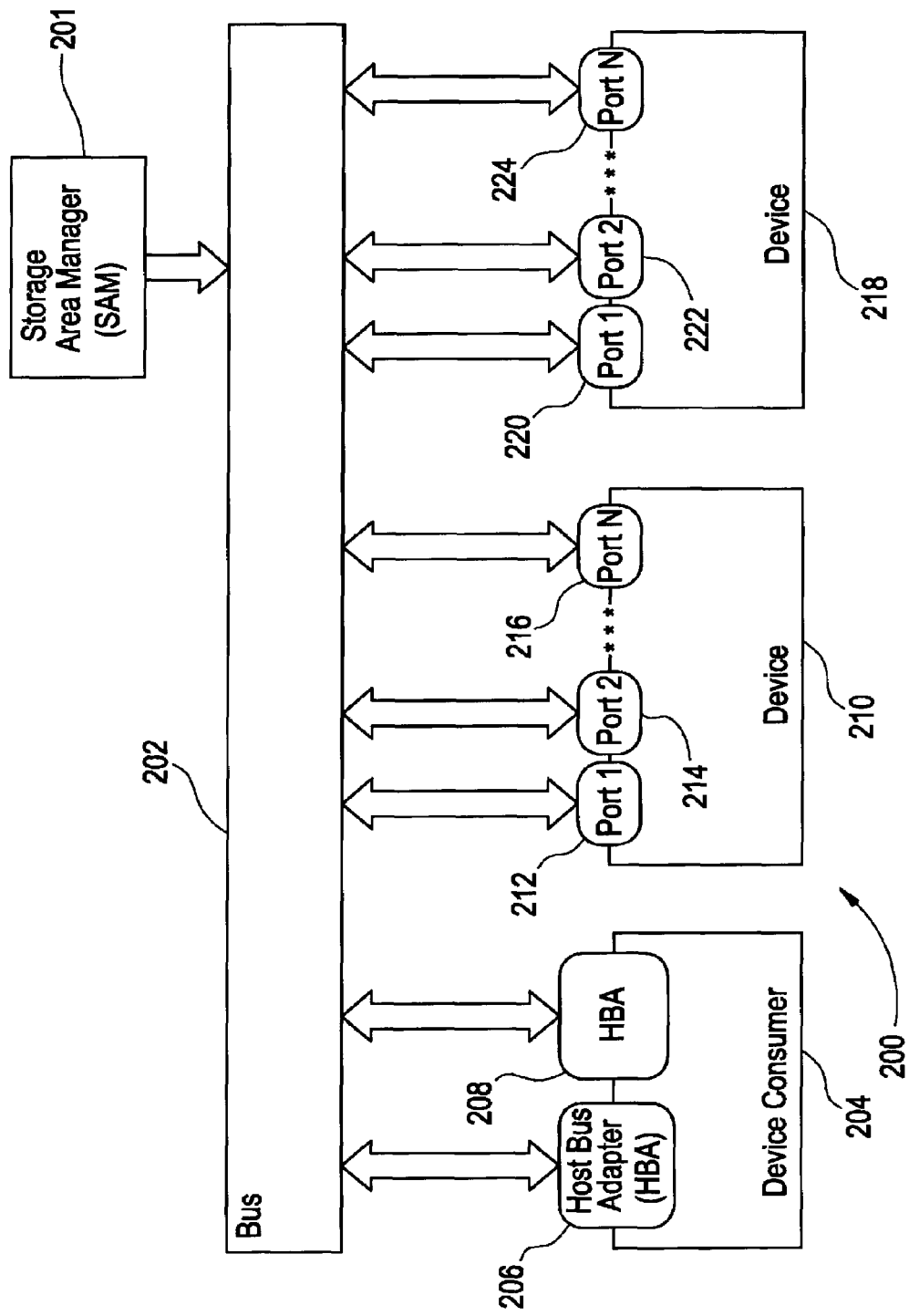
FIG. 1 is a hardware block diagram according to an embodiment of the invention.

FIG. 1 depicts a hardware block diagram of a system 200 according to an embodiment of the invention that incorporates software according to an embodiment of the invention. The system 200 includes a bus (e.g., SCSI, Ethernet (iSCSI/IP/Gbit Ethernet), fibre channel, etc.) 202 to which are connected a consumer of device services (hereafter a device consumer) 204, a device 210, a device 218 and a storage area manager (SAM) 201.

The device consumer 204 includes host bus adapters (HBAs) 206 and 208 that permit the device consumer 204 to connect to and interact with the bus 202. The device 210 has port 1 (212), port 2 (214), ... port N (216). Device 218 has port 1 (220), port 2 (222), ... port N (224). For simplicity of disclosure, only two devices 210 and 218 and two HBA's 206 and 208 have been depicted, but fewer or more devices could be attached to the bus and fewer (1) or more HBAs could be present in the consumer depending upon the particular circumstances of a situation.

Figure 2:
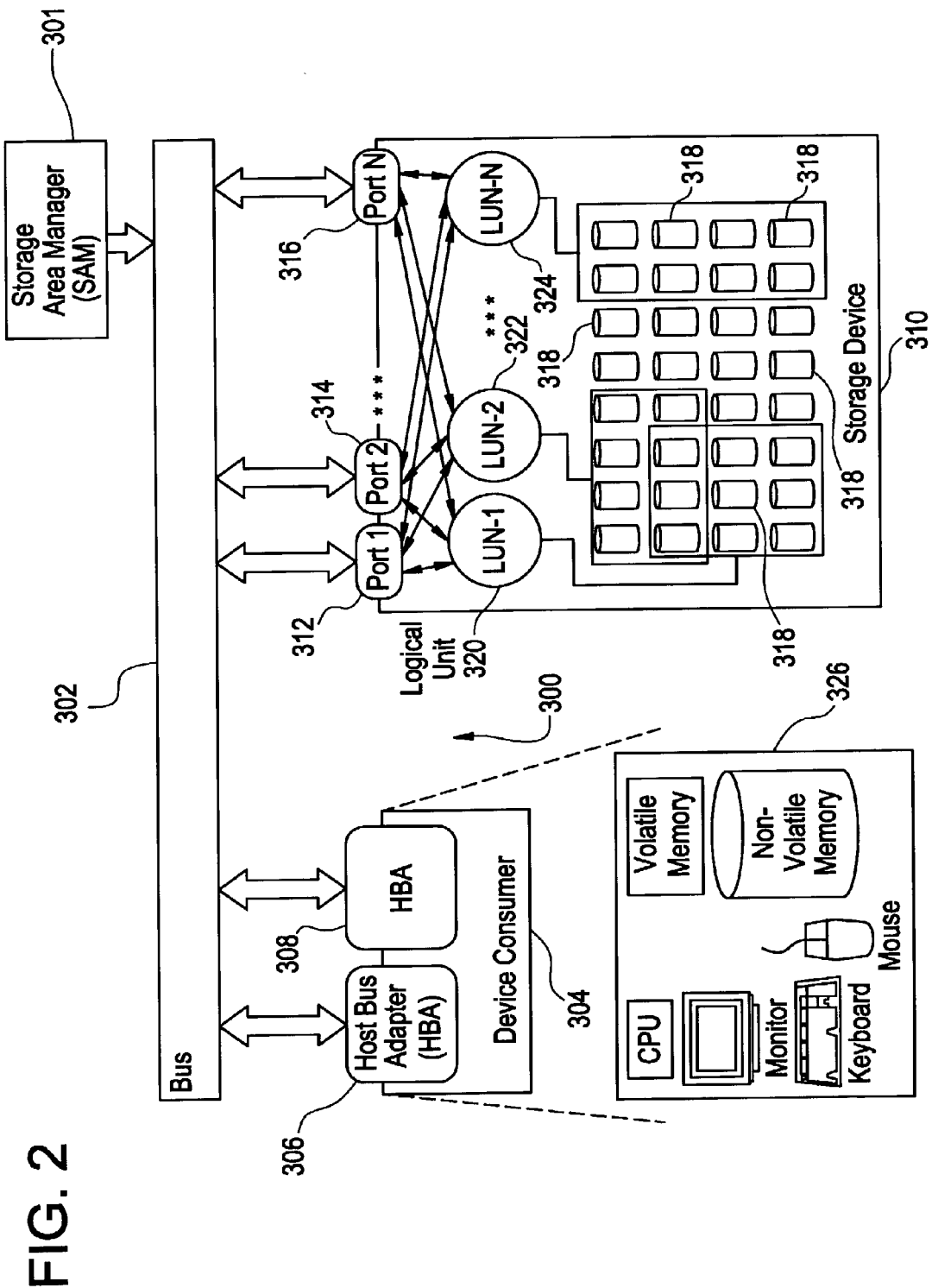
FIG. 2 is a hardware block diagram according to another embodiment of the invention.

FIG. 2 depicts a hardware block diagram corresponding to a particular type of system 200, namely a storage area system or storage area network (SAN) 300. The SAN 300 includes a bus 302, a device consumer 304, a non-volatile storage device 310 and a storage area manager (SAM) 301.

The device consumer 304 can include HBAs 306 and 308. Fewer or greater numbers of HBAs 306/308 can be provided depending on the circumstances of a situation.

The device consumer 304 can take the form of a computer 326 including at least a CPU, input device(s), output device(s) and memory. For example, the computer 326 has been depicted as including a CPU, an IO device, volatile memory such as RAM and non-volatile memory such as ROM, flash memory, disc drives and/or tape drives.

The storage device 310 includes port 1 (312), port 2 (314), ... port N (316) and logical units (LUNs) 1, 2, ... N. Also included in the storage device 310 are non-volatile memories 318 such as disc drives, tape drives and/or flash memory. To remind the reader of the logical nature of a LUN, a simplistic mapping between the LUNs 320, 322 and 324 and physical memory devices 318 has been illustrated in FIG. 2.

The SAM 201, 301 can also take the form of a computer including at least a CPU, input device(s), output device(s) and memory.

The SAM 201, 301 enables storage administrators to manage the SAN 200, 300 environment. The SAM 201, 301 enable storage administrators to control and monitor the health of all the components within the SAN 200, 300, including tape and disk storage, servers and fibre channel switches as well as any directly attached storage.

Figure 3:
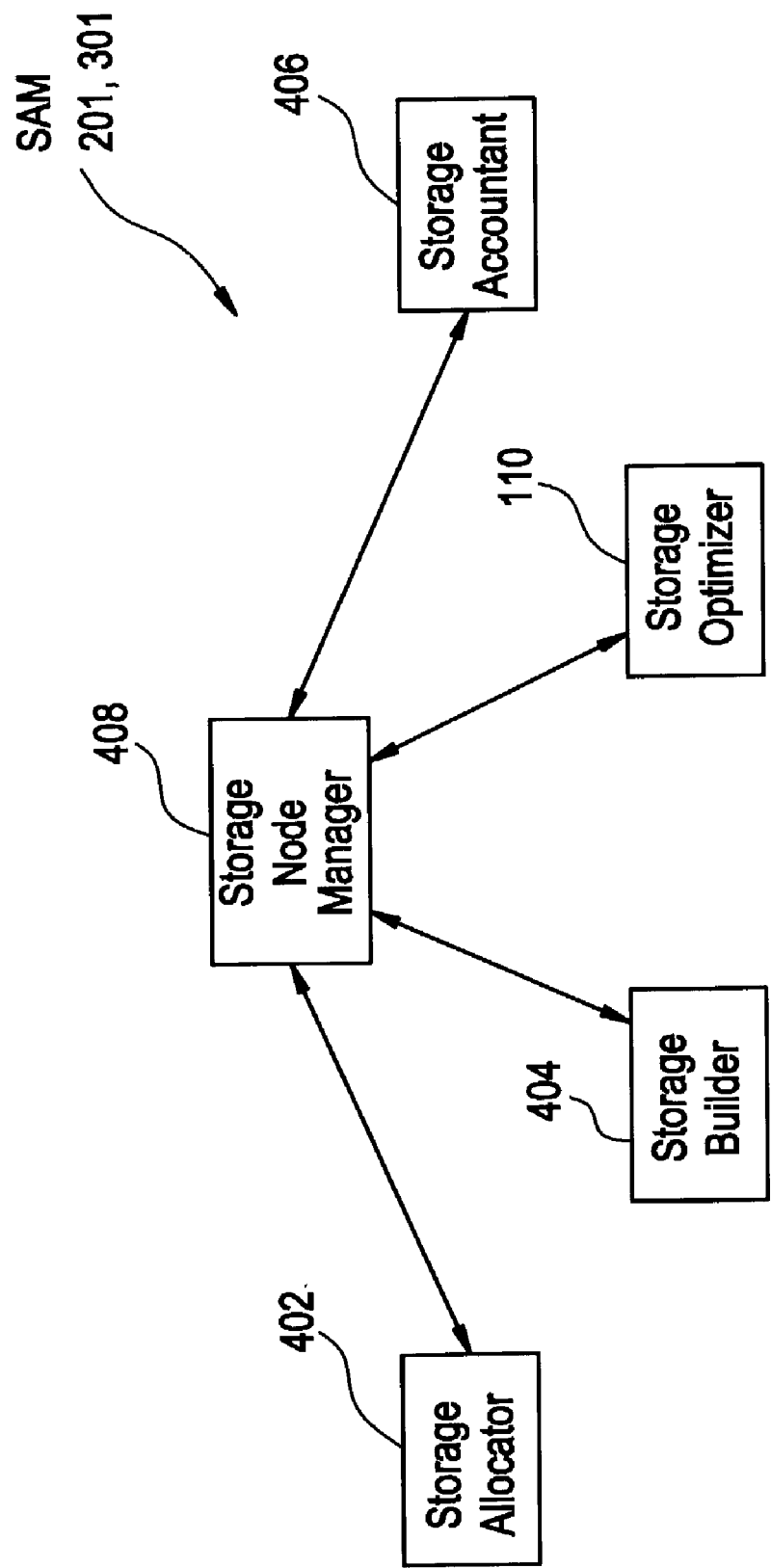
FIG. 3 is a hardware block diagram of the storage area manager (SAM) according to an embodiment of the invention.

As illustrated in FIG. 3, the SAM 201, 301 may include a Storage Allocator 402, a Storage Builder 404, a Storage Accountant 406, a Storage Node Manager 408, and a Storage Optimizer 410.

The Storage Allocator 402 maps storage and servers, and allows the secure allocation of storage to servers. The Storage Allocator 402 permits viewing, managing, and controlling access to data stored in the SAN 200, 300. The Storage Allocator 402 simplifies SAN 200, 300 expansion by allowing storage to be added, removed or assigned without a host reboot. The Storage Allocator 402 also allows 'share groups' to be set up, which allow for the configuration of clustered servers.

To securely assign storage to servers to prevent data loss and unauthorized access, a LUN or group of LUN's may be selected using the Storage Allocator 402, by dragging-and-dropping them to a server. If a particular server no longer needs storage, the Storage Allocator 402 permits reassignment to another server, for improved storage utilization.

The Storage Accountant 406 enables service providers to measure storage assigned to end users for financial analysis, budgeting and billing. By classifying the storage offering based on attributes of storage and services associated therewith, users are able to keep track of customer profile, compare the price of storage by gigabytes per hour with the total cost of storage service offering, manage the assignment of LUNs and associate a specific price with the LUN, and calculate charges based on service level price, size of LUNs assigned and duration of storage consumption.

The Storage Accountant 406 can generate usage and billing views in csv, html and XML formats, which can then be integrated with third party billing and financial application, or to maintain an audit log.

The Storage Node Manager 408 provides centralized SAN 200, 300 management through at least one interface, and consolidation of multi-host storage device management tools. Automatic device discovery, health monitoring and automated alerts ensure improved asset availability. Adding, deleting or changing of storage configurations and tracking data center environment changes may be implemented through the at least one interface. The Storage Node Manager 408 also enables system administrators to customize location fields and identify the physical location of devices in distributed environments.

The Storage Optimizer 410 enables users to identify bottlenecks, and enhance the performance of the SAN 200, 300. The Storage Optimizer 410 provides storage managers with the information they need to react to slowdowns and identify bottlenecks by monitoring performance of the entire SAN 200, 300, including hosts, infrastructure and storage.

By monitoring key metrics of SAN 200, 300 performance storage managers are enabled to implement appropriate service levels. The Storage Optimizer 410 collects and manages a range of raw or summarized data, and offers several types of access to it, giving storage managers information needed to improve the SAN 200, 300 operation.

With the use of historical graphs, storage managers can identify trends and anomalies in their SAN 200, 300 infrastructure. Using the Storage Optimizer 410, the impact of system, storage and infrastructure upgrades can be evaluated, and overall SAN 200, 300 performance improved.

The SAM 201, 301 may also include a Storage Builder 404, which assists with the assessment, control and planning of storage capacity, to improve the utilization of resources. The Storage Builder 404 enables administrators to improve the utilization of storage resources by viewing the current allocation and consumption of storage resources by host, storage device, LUN, partition, volume, directory and user, across a variety of operating systems.

By using historical trend data, the Storage Builder 404 may also extrapolate future storage capacity needs. This enables managers to proactively predict when they will need to add capacity. The Storage Builder 404 also may give early warning of potential capacity short-falls, identify files for possible deletion (files which are never accessed, for example, or files with specifically identified extensions), and enable IT managers to create groups whose current usage patterns can then be analyzed for future resource planning purposes.

The Storage Builder 404 also performs distributed data collection and processing of information periodically scheduled for collection on the device consumers 204, 304. In an embodiment, the mechanism for data delivery is event-based and allows event messages to travel from the device consumers 204, 304 to the SAM 201, 301, a connection mechanism allows the SAM 201, 301 to contact and transfer information from the device consumers 204, 304, a work thread queuing mechanism reduces the number of concurrent threads in use at any given time, and a centralized storage mechanism (typically a database, such as device 218, 318), is used for storage.

Figure 4:
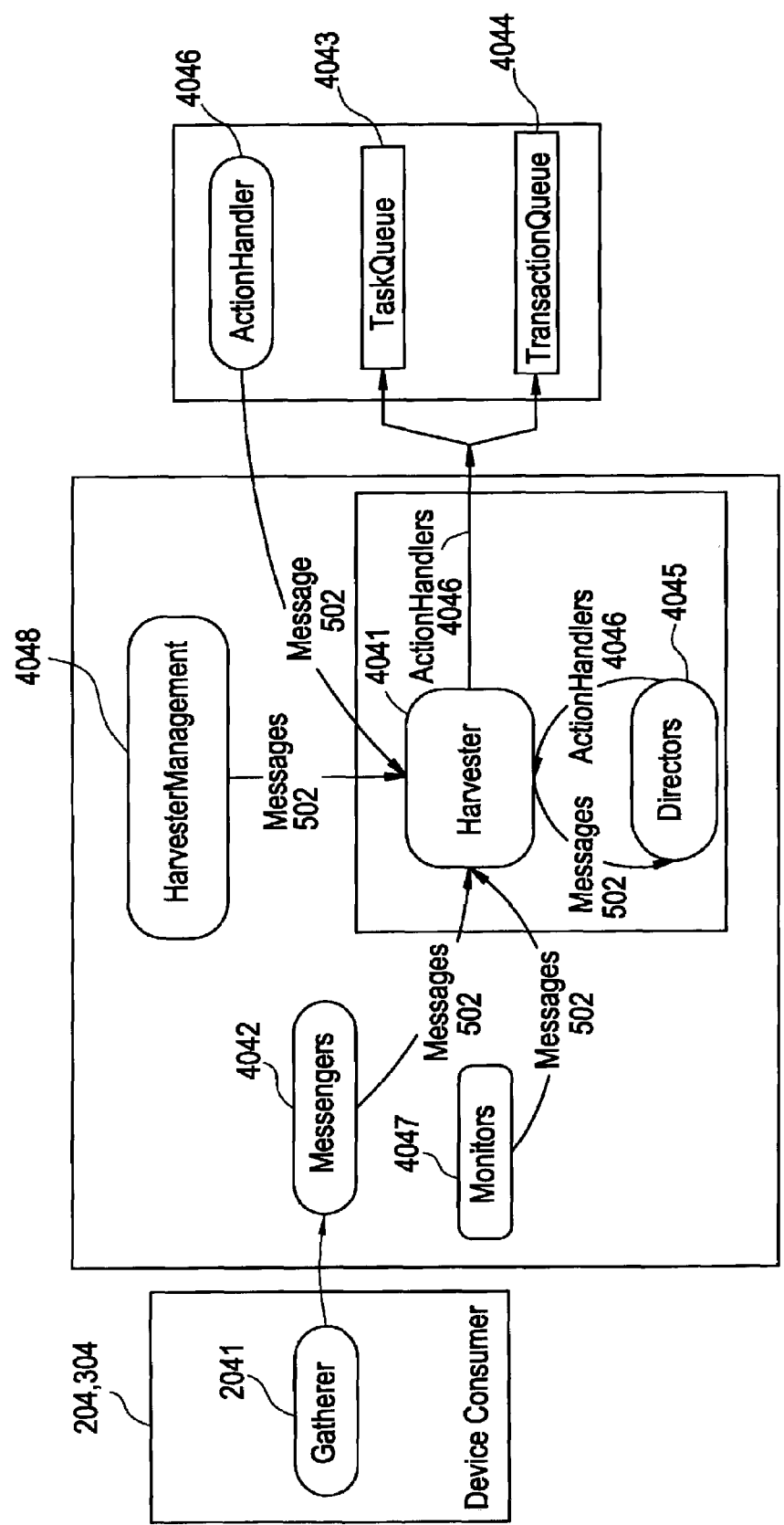
FIG. 4 is a hardware block diagram of the Storage Builder according to an embodiment of the invention.

FIG. 4 illustrates the Storage Builder 404 according to an embodiment of the invention. The Harvester 4041 is an event-based collection mechanism for collecting data gathered on device consumers 204, 304. One purpose of the event-based mechanism is two-fold. First, an event-based mechanism provides a level of abstraction between a request for service and the entity that provides the service. Second, an event-based mechanism provides a mechanism for collection of data without having to periodically poll all device consumers 204,304 on the SAN 200, 300 for information.

Gatherers 2041 on each device consumer 204, 304 gather information and send an end collection event after completion. The event is forwarded to all SAMs 201, 301 discovered on the domain of the each device consumer 204, 304 via, for example, an event subscription system.

At the SAMs 201, 301, the event(s) are received by one or more Messengers 4042 via the event subscription system. Messengers 4042 relay, and if necessary, translate, the event into a Message 502 of interest to the Harvester 4041. The Harvester 4041 receives the Message 502 and places it in at least one queue. In an embodiment, the at least one queue includes a TaskQueue 4043 and a TransactionQueue 4044. A separate thread takes items from the TaskQueue 4043 or the TransactionQueue 4044 and queries at least one Director 4045 for any possible ActionHandlers 4046 that are capable of handling the Message 502. The set of at least one Director 4045 defines what ActionHandler 4046 can be generated by the Harvester 4041, thus defining the Harvester's 4041 functionality. The ActionHandlers 4046 are run in separate threads using the queuing mechanism. Because the set of at least one Directors 4045 is modular, they allow easy plug-in functionality to expand or contract the functionality of the Harvester 4041 as needed. To allow greater scalability, multiple Harvesters 4041 can also be used, each located on a separate machine.

Monitors 4047 are Harvester 4041 functionality that can generate messages on a periodic or request triggered basis. HarvesterManagement 4048 is the remote interface used by the Harvester 4041.

Each Harvester's 4041 functionality may be defined by its associated set of at least one Directors 4045 and thus the funneled Messages 502 will allow segmenting to achieve scalability requirements. All Harvesters 4041 may include ActionHandlers 4046 that communicate with a database, such as device 218, 318. This database may be located on a separate machine, and can use the standard mechanism shown in FIG. 2 for increasing scalability.

The Harvester 4041 generally operates as follows. The Messenger 4042 receives an event that must be handled in some manner. The Messenger 4042 generates or sends (if the event is actually just a Message 502) the event to the Harvester 4041. The Harvester 4041 then uses its associated set of at least one Directors 4045 to create the ActionHandlers 4046. The ActionHandlers 4046 are then added to the TaskQueue 4043 or the TransactionQueue 4044.

The task queue is a work pooling mechanism and is specialized into one for general non-database work, the TaskQueue 4043 and another, the TransactionQueue 4044, that performs transactions on a database. Both queues may be shared by all Harvesters 4041 on the same machine. The ActionHandler 4046 is run by the TaskQueue 4043. After the ActionHandler 4046 completes, the Harvester 4041 receives a collection of Messages that correspond to items encountered during execution which the ActionHandler 4046 could not handle. Unhandled messages are then sent out via by the ActionHandler 4046, if the ActionHandler 4046 completes successfully, to EventService 4049 where they may possibly be retrieved by other Messengers 4042, connected to Harvesters 4041 with a different set of at least one Directors 4045, and hence, different functionality to possibly begin the cycle again. The unhandled messages may be used to chain sets of actions together.

If a Message 502 does not correspond to something any Director 4045 is capable of handling, no ActionHandler 4046 is created, but this condition is still handled.

Figure 5:
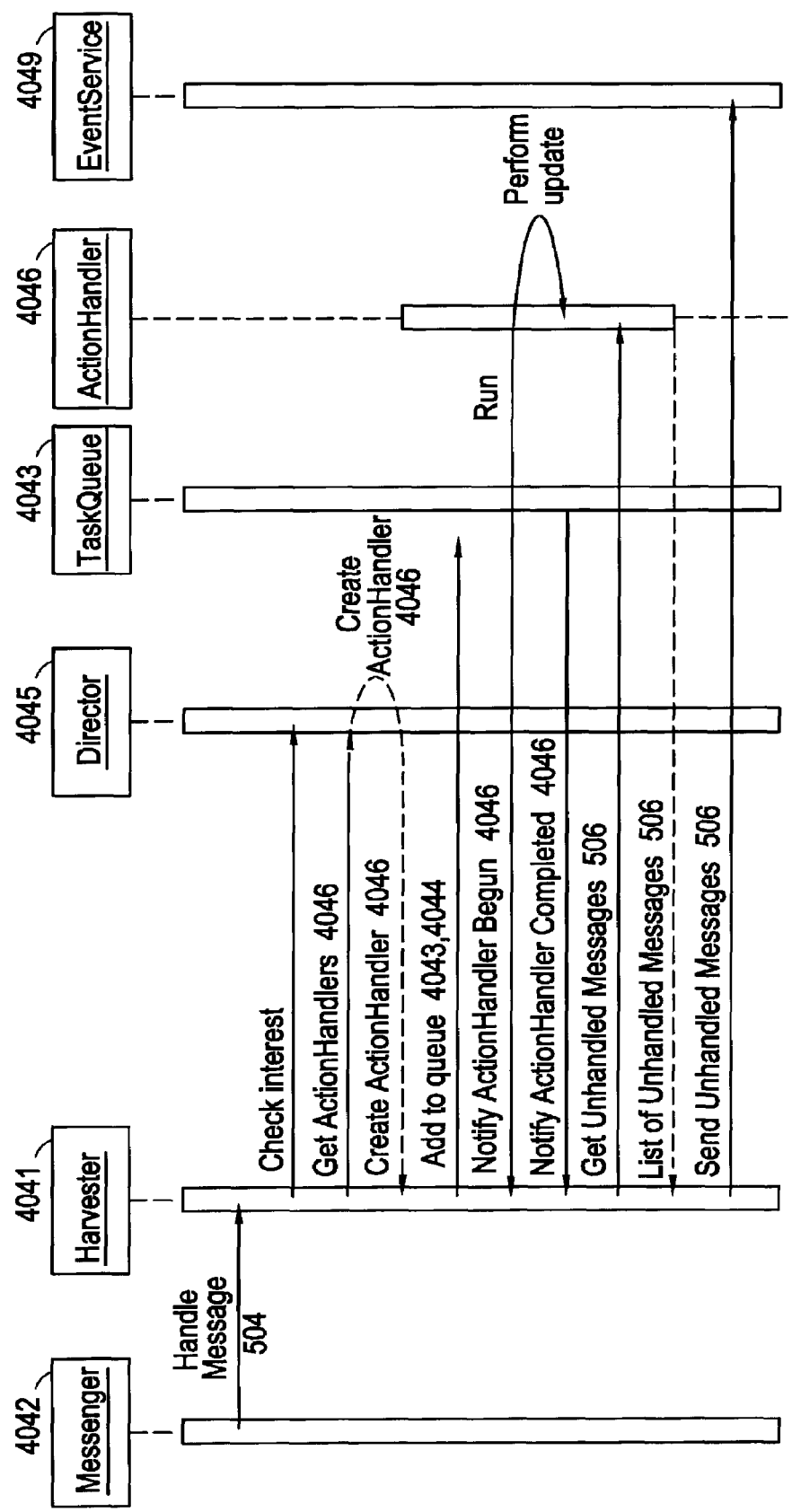
FIG. 5 is a sequence diagram illustrating a Message handling sequence according to an embodiment of the invention.

The processes shown in the following sequence diagrams illustrate sequences of how Messages 502 may be handled. FIG. 5 is a sequence diagram according to unified modeling language (UML) principles. The sequence in FIG. 5 depicts the various interactions between the Messenger 4042, the Harvester 4041, the at least one Director 4045, the TaskQueue 4043, the ActionHandler 4046, and the EventService 4049.

As illustrated in FIG. 5, the Messenger 4042 sends a handle message 504 to the Harvester 4041. The Harvester 4041 requests the Director 4045 to get an ActionHandler 4046 and/or creates an ActionHandler 4046. The Director 4045 creates the ActionHandler 4046 at the direction of the Harvester 4041 and returns the created ActionHandler 4046 to the Harvester 4041 so that the Harvester 4041 can add the newly created ActionHandler 4046 to one of the TaskQueue 4043 and the TransactionQueue 4044. The Harvester 4041 then places the ActionHandler 4046 in one of the TaskQueue 4043 and the TransactionQueue 4044 and notifies the TaskQueue 4043 of such action. When the ActionHandler 4046 is reached in the TaskQueue 4043, the proper sequence is run in the ActionHandler 4046 and updated. When the ActionHandler 4046 is completed, the TaskQueue 4043 notifies the Harvester 4041 that the ActionHandler 4046 is complete. The Harvester 4041 also queries the ActionHandlers 4046 with regard to any unhandled messages 506. The ActionHandler 4046 returns a list of unhandled messages 506 to the Harvester 4041. The Harvester 4041 then sends any unhandled messages 506 to EventService 4049.

Figure 6:
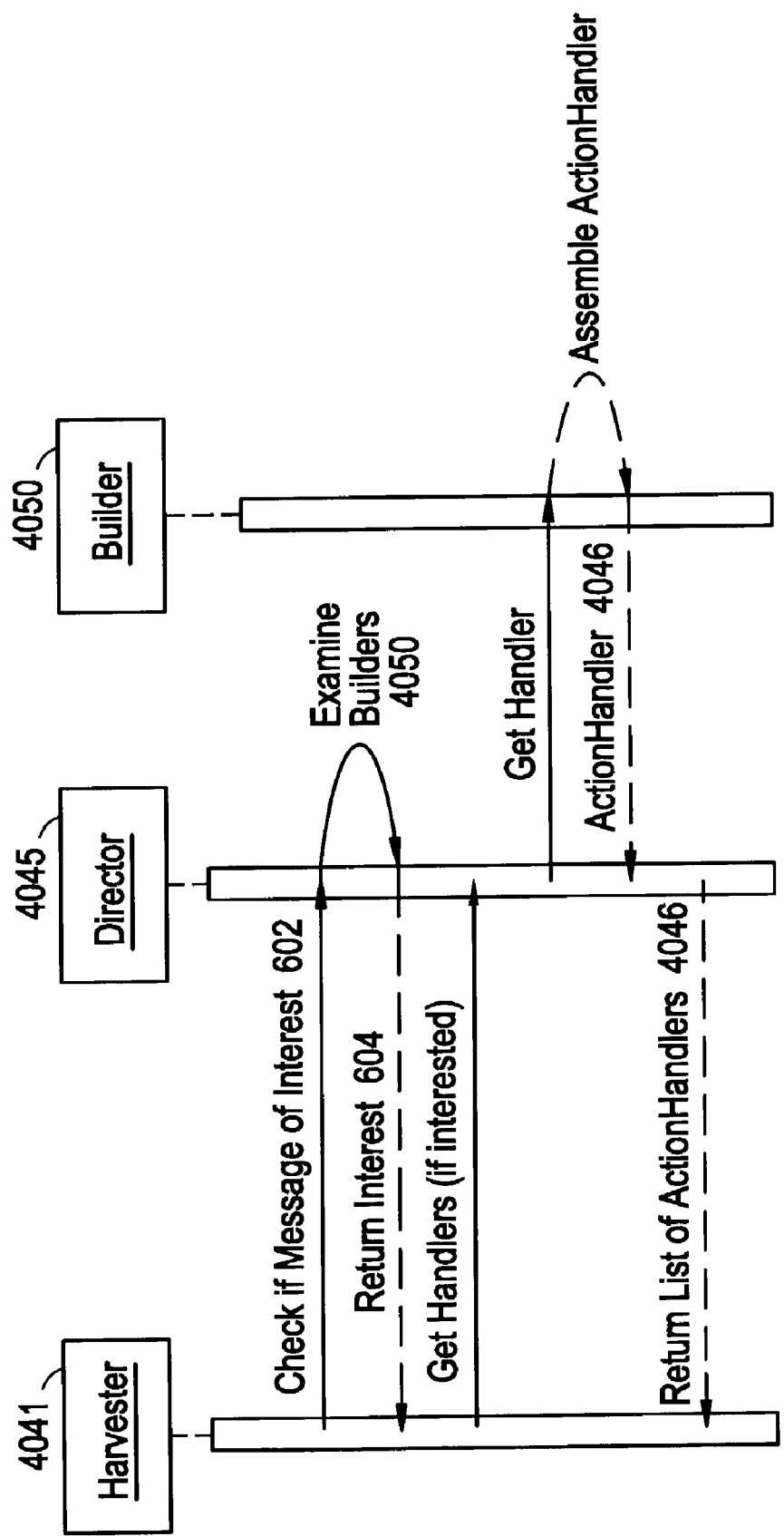
FIG. 6 is a sequence diagram illustrating the interaction between the Harvester, at least one Director, and at least one Builder, according to an embodiment of the invention.

FIG. 6 is a sequence diagram showing the interaction between the Harvester 4041, at least one Director 4045, and at least one Builder 4050, according to an embodiment of the invention.

For the Harvester 4041 to determine the appropriate ActionHandler 4046, the Harvester 4041 queries all associated Directors 4045. The Harvester 4041 may first check a Director 4045 to see if the given message is of interest 602. If the given message is of interest, the Harvester 4041 attempts to get all ActionHandlers 4046 for that Message 502. The Director 4045 uses associated Builders 4050 to construct the ActionHandlers 4046 as appropriate.

As shown in FIG. 6, the Harvester 4041 forwards messages received from the Messenger 4042 to the Director 4045 to see if the messages are of interest to the Director 4045. The Director 4045 queries all present Builders 4050 and if the Builders 4050 return interest 604 indicating a Builder 4050 can handle the message, the Director 4045 forwards such information to the Harvester 4041. The Harvester 4041 then requests the ActionHandlers 4046, if the Builders 4050 are interested, from the Director 4045. The Director 4045 gets the ActionHandler 4046 from the Builder 4050, the Builder 4050 assembles the ActionHanlder 4046 and returns a result from the ActionHandler 4046 to the Director 4045. The Director 4045 then forwards a return list of ActionHandlers 4046 to the Harvester 4041.

Further, a single Message 502 could result in multiple ActionHandlers 4046 being created since the Harvester 4041 may include multiple Directors 4045 and multiple Builders 4050 associated with each Director 4045. Each ActionHandler 4046 is then run. In practice, only a single ActionHandler 4046 is run, but different Directors 4045 are plugged in to obtain different behavior.

The Harvester 4041 framework fits within the standard JCORE framework or JINI framework by being a server component that resides on the SAM 201, 301 that is initialized by a standard SCP file (CSHarvester.scp for the CSHarvesterComponent, and CPHarvester.scp for the CPHarvesterComponent). The base HarvesterComponent may perform all standard initialization and calls the initializeHarvester routine to perform initialization specific to a HarvesterComponent implementation. Each SAM 201, 301 may have one or multiple, separate or grouped instances of a Harvester 4041 that can be enabled/disabled/shutdown without affecting any other instances. All instances of the Harvester 4041 may share a common set of Harvester 4041 processing queues. The remote interface used by the HarvesterComponent is HarvesterManagement 4048, shown in FIG. 4. This provides a remotable object that can be used for interaction with the instance of the Harvester 4041 associated with this component.

Figure 7:
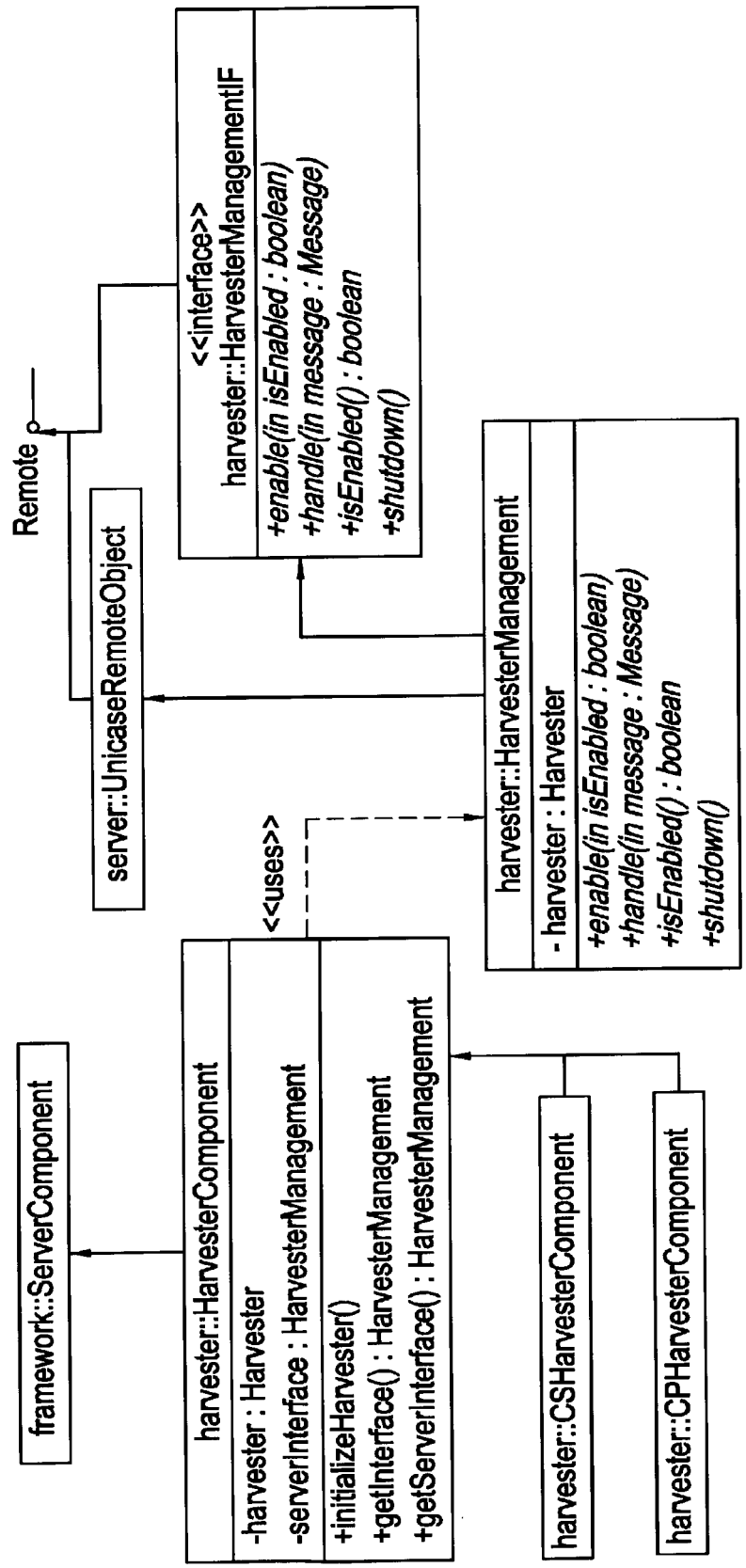
FIG. 7 is a relationship chart showing class relationships between CPHarvesterComponent, CSHarvesterComponent, HarvesterComponent, ServerComponenet, UnicaseRemoteObject, HarvesterManagement, and HarvesterManagmentIF according to an embodiment of the invention.

FIG. 7 is a relationship chart showing class relationships between CPHarvesterComponent, CSHarvesterComponent, HarvesterComponent, ServerComponenet, UnicaseRemoteObject, HarvesterManagement 4048, and HarvesterManagmentIF.

As described above, the Harvester's 4041 functionality is defined as what Messages 502 are delivered to that Harvester 4041, which Messages 502 the Harvester 4041 is capable of handling, and in what ways a particular type of Message 502 is handled. These features are defined by Modules associated with an instance of the Harvester 4041. All modules associated with a Harvester 4041 are managed by at least one Director 4045. The Director 4045 allows the Harvester 4041 to enable/disable/shutdown functionality as needed, as well as find ActionHandlers 4046 capable of handling Messages 502. As illustrated in FIG. 7, a "+" indicated a public method, whereas a "−" indicates a private method. In an embodiment, public methods may be considered part of an external interface, while private methods are internal method used to perform a function, but are not generally considered part of the external interface.

Figure 8:
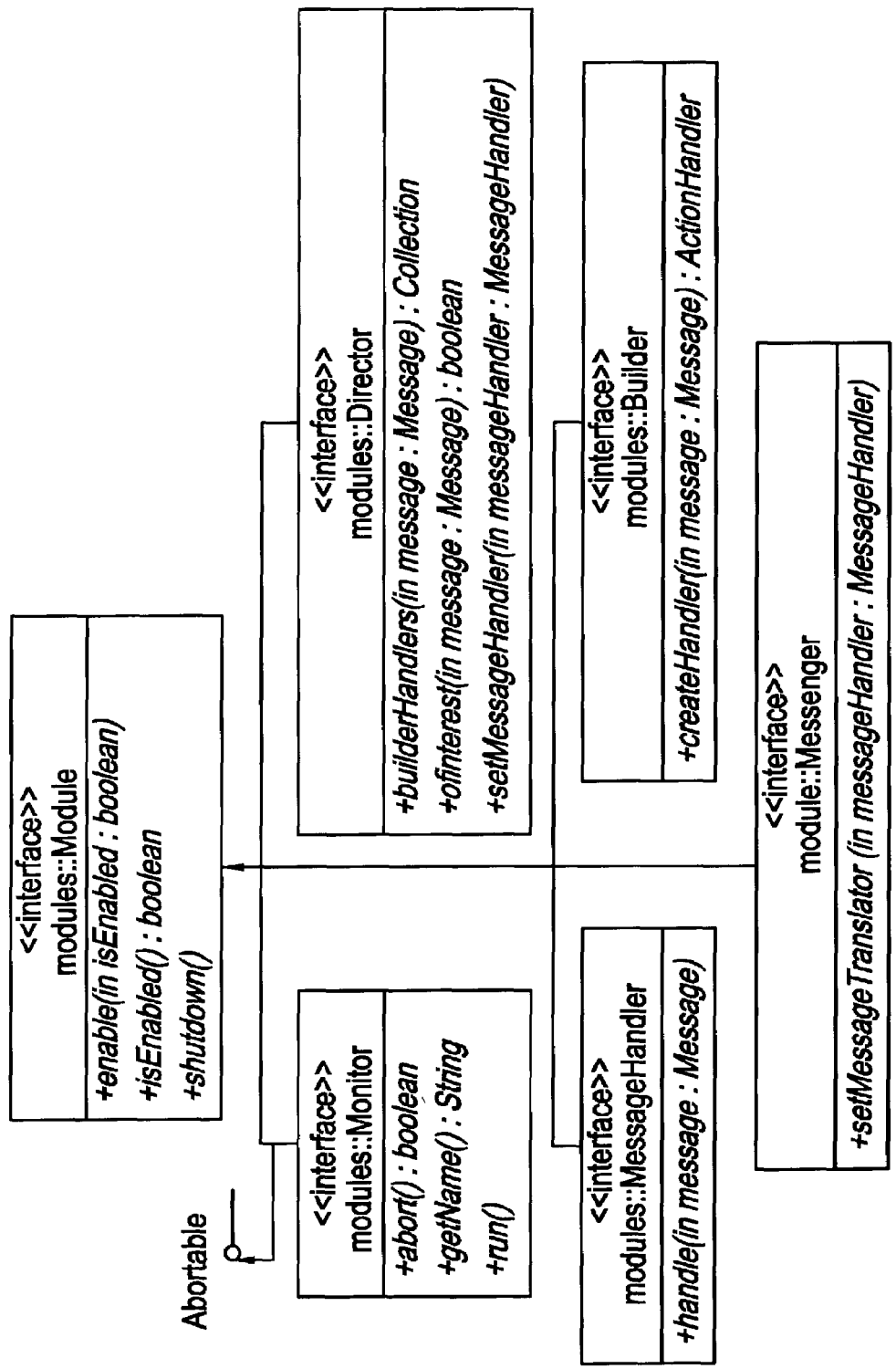
FIG. 8 is a relationship chart showing class relationships between Module, MessageHandler, a Messenger, a Director, and a Builder according to an embodiment of the invention.

FIG. 8 is relationship chart showing class relationships between Module, MessageHandler, Messenger 4042, at least one Director 4045, and at least one Builder 4050.

Module may be any type of functionality associated with the Harvester 4041. All modules can be enabled, disabled, and shutdown. All modules by definition are disabled on construction.

Builder 4050 is a module that generates an ActionHandler 4046 capable of dealing with a given message 502. Each Builder 4050 may be a simple factory class that receives messages 502 and builds the appropriate ActionHandler 4046 to handle the messages 502.

Director 4045 is a module that controls a set of other modules. Director 4045 provides the interface that the Harvester 4041 uses for interaction with Builder(s) 4050 for generation of ActionHandlers 4060. MessageHandler is a module that is capable of receiving and handling messages 502. The Harvester 4041 itself is a MessageHandler.

Messenger 4042 is a module that is capable of responding to events from an event service and translating an occurrence into a message 502 of interest to a MessageHandler.

Figure 9:
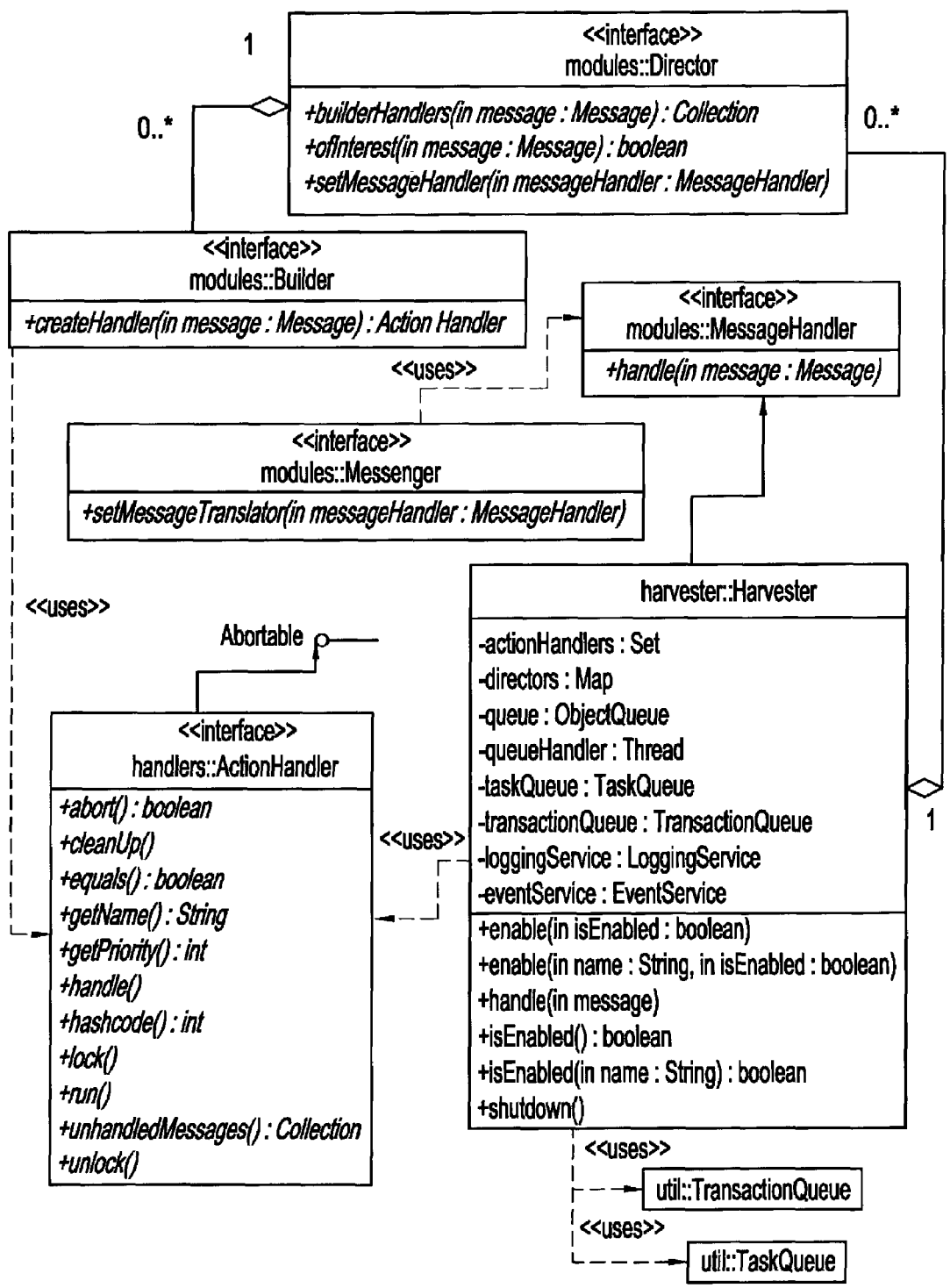
FIG. 9 is a relationship chart showing class relationships between at least one Director 4045, at least one Builder 4050, at least one Messenger 4042, MessageHandler, at least one TaskQueue 4043, at least one TransactionQueue 4044, and at least one Harvester 4041, from the Harvester 4041 perspective according to an embodiment of the invention.

FIG. 9 is a relationship chart showing class relationships between at least one Director 4045, at least one Builder 4050, at least one Messenger 4042, MessageHandler, at least one TaskQueue 4043, at least one TransactionQueue 4044, and at least one Harvester 4041, from the Harvester 4041 perspective.

As described above, the Harvester 4041 is a message/response handling system. Messages 502 are received from Messengers 4042 and given to a MessageHandler (Harvester 4041) for handling. The Harvester 4041 may query its set of Directors 4045 to determine if the Message 502 is of interest to any of the set of Directors 4045. If yes, the Director 4045 will be asked to generate ActionHandlers 4046 for the Message 502. The Director 4045 accomplishes this by examining its set of Builders 4050. All generated ActionHandler 4046 can then be run by the Harvester 4041 using either its associated TransactionQueue 4044 or TaskQueue 4043 to handle the received message 502.

Figure 10:
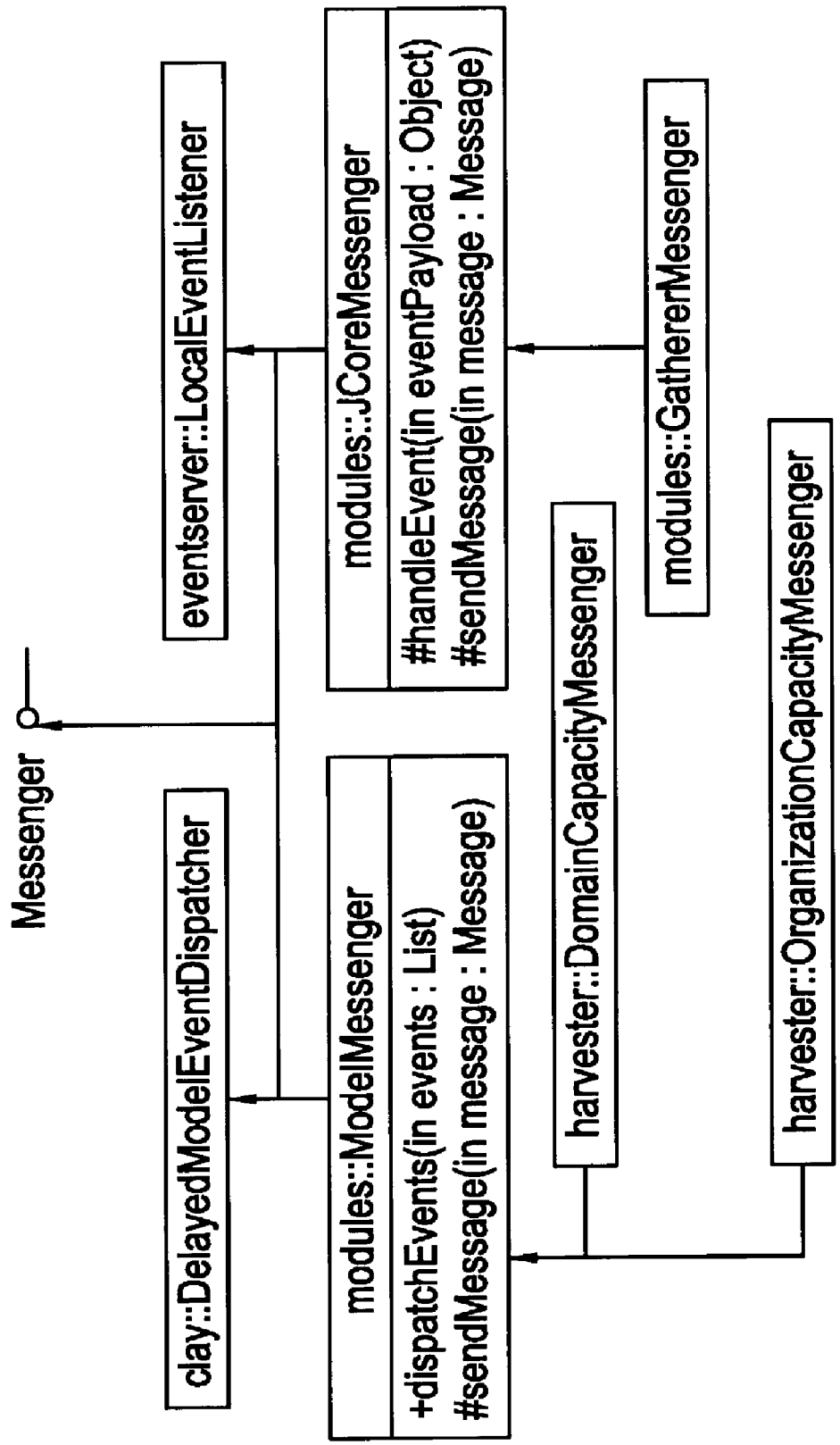
FIG. 10 is a relationship chart showing class relationships between DelayedModelEventDispatcher, ModelMessenger, LocalEventListener, DomainCapacityMessenger, OrganizationCapacityMessenger, JCoreMessenger, and GathererMessenger from the perspective of the JCoreMessenger according to an embodiment of the invention.

FIG. 10 is a relationship chart showing class relationships between DelayedModelEventDispatcher, ModelMessenger, LocalEventListener, DomainCapacityMessenger, OrganizationCapacityMessenger, JCoreMessenger, and GathererMessenger from the perspective of the JCoreMessenger.

Messengers 4042 receive events from various event systems and translate them into messages 502 for use by the Harvester 4041. Associated with each Messenger 4042 is a MessageHandler (typically an instance of the Harvester 4041) which takes the messages 502 and handles them appropriately.

Figure 11:
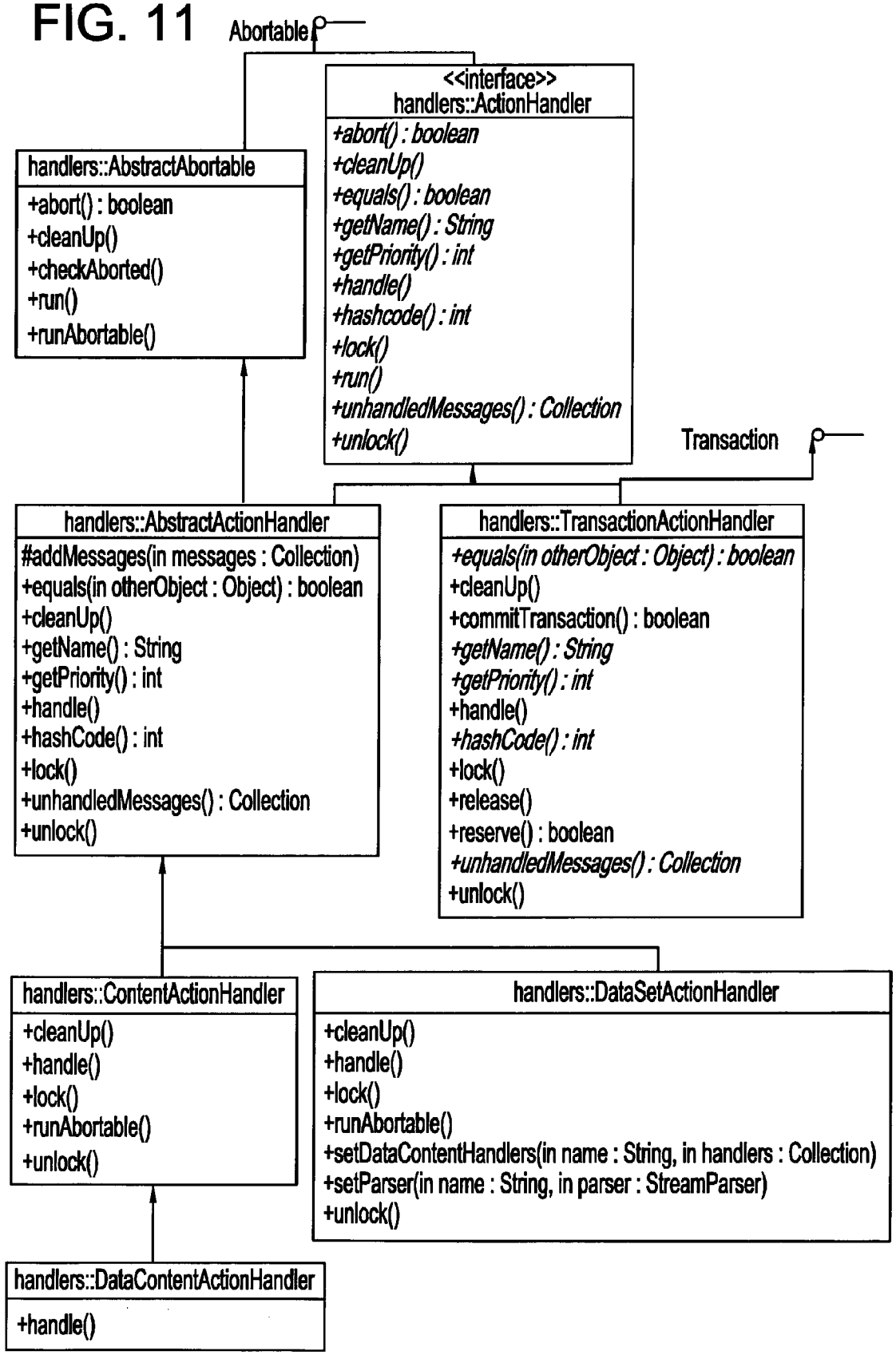
FIG. 11 is a relationship chart showing class relationships between AbstractAbortable, AbstractActionHandler, ActionHandler 4046, ContentActionHandler, DataContentActionHandler, TrasactionActionHandler, and DataSetActionHandler according to an embodiment of the invention.

FIG. 11 is a relationship chart showing class relationships between AbstractAbortable, AbstractActionHandler, ActionHandler 4046, ContentActionHandler, DataContentActionHandler, TrasactionActionHandler, and DataSetActionHandler.

ActionHandlers 4046 may be processes that are created to handle a Message 502. Typical tasks for a process include retrieving data from a Gatherer 2041 or archive file, updating a database 218, 318, creating of reports, etc. ActionHandlers 4046 are runnable and abortable, and provide a mechanism for reporting conditions that were discovered during processing which could not be handled.

An ActionHandler 4046 may perform more than a database update. The specifics of what action is performed depends on how the ActionHandler 4046 is constructed. In SAM, 201, 301, there are instances where XML reports are generated, hosts are contacted to register them to send events to a central management server, to notify other components or the centralized management of status changes, etc.

ActionHandlers 4046 use composition, rather than inheritance to achieve their level of multiuse. The ActionHandler interface of FIG. 9 defines the generic properties of ActionHandlers 4046, and there are a set of general purpose ActionHandlers 4046. DataSetContentActionHandler and ContentActionHandler are two examples of general purpose ActionHandlers 4046. Both DataSetContentActionHandler and ContentActionHandler use a set of associated ContentHandlers to determine their individual functionality. First, a ContentActionHandler is created, and then ContentHandlers are added thereto that to perform desired actions. If there is a ContentHandler that generates historical measurements for some metric, and a ContentHandler that updates volume capacity information, both could be added to a ContentActionHandler to obtain an ActionHandler 4046 that both generates historical measurements and updates volume capacity. The same historical measurement ContentHandler could be added to a ContentHandler that updates user account consumption. As a result, two different ActionHandlers 4046 can be created with at least some of the same parts (ContentHandlers).

Referring back to FIG. 11, AbstractActionHandler is a base class that provides basic ActionHandler 4046 functionality common to most ActionHandlers 4046. The addMessage method provides a mechanism that derived classes can use to add unhandled messages to be reported by the unhandledMessages method.

Figure 12:
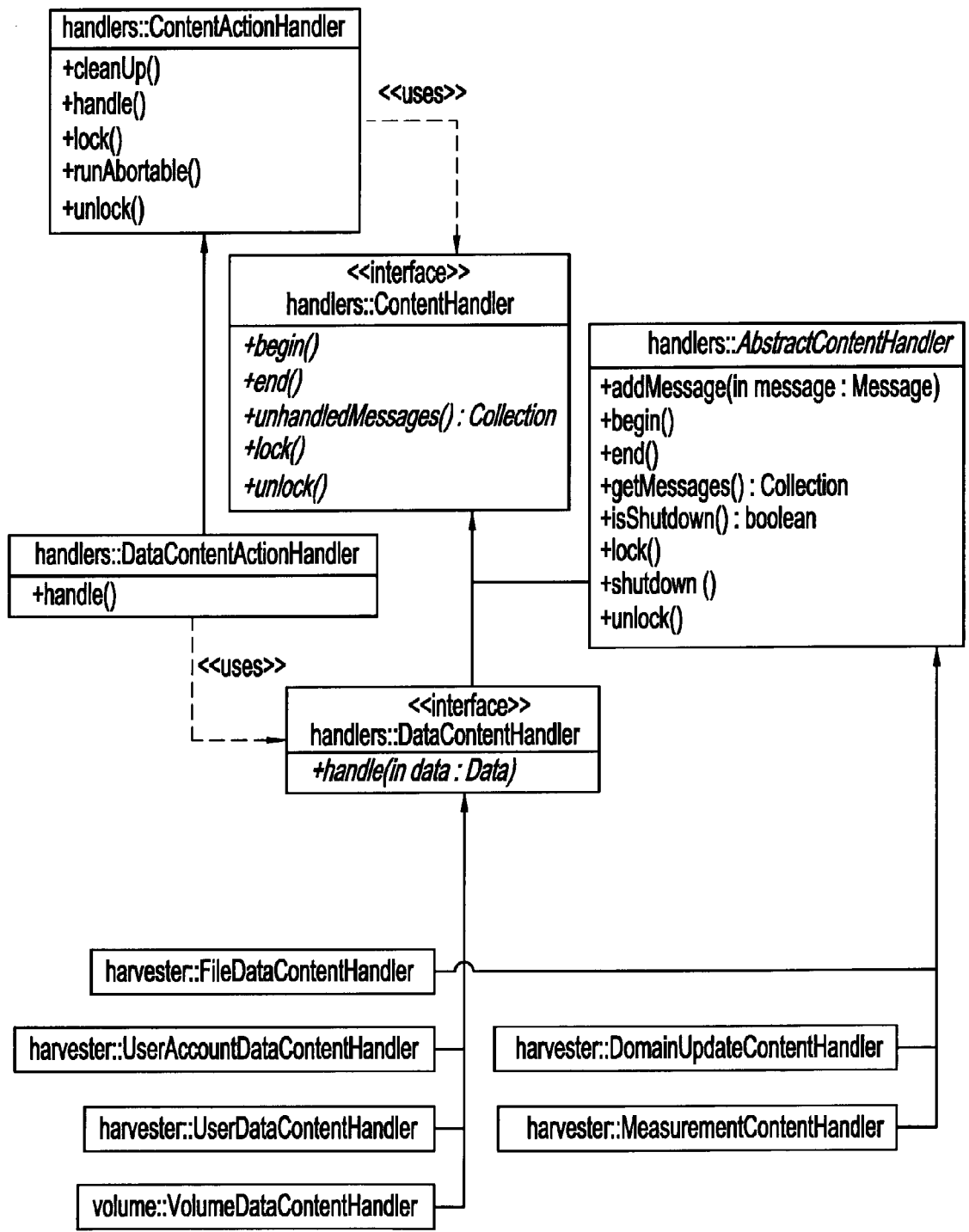
FIG. 12 is a relationship chart showing class relationships between ContentActionHandler, DataContentActionHanlder, ContentHandler, DataContentHandler, AbstractContentHandler, FileDataContentHandler, UserAccountDataContentHandler, UserDataContentHandler, VolumeDataContentHandler, DomainUpdateContentHandler, and MeasurementContentHandler according to an embodiment of the invention.

FIG. 12 is a relationship chart showing class relationships between ContentActionHandler, DataContentActionHanlder, ContentHandler, DataContentHandler, AbstractContentHandler, FileDataContentHandler, UserAccountDataContentHandler, UserDataContentHandler, VolumeDataContentHandler, DomainUpdateContentHandler, and MeasurementContentHandler.

As illustrated in FIG. 12, ContentActionHandler is an ActionHandler 4046 that performs an action based on its associated ContentHandlers. DataContentHandler is an ActionHanlder 4046 that performs an action based on its associated DataContentHandlers. DataSetActionHandler is an ActionHandler 4046 that performs an action based on reading data from a data set source. TransactionActionHandler is an ActionHandler 4046 that is capable of wrapping any standard ActionHandler 4046 and making it a standard TransactionQueue 4044.

ContentActionHandlers perform an action based on a set of associated ContentHandlers and DataContentHandlers. A ContentHandler is capable of a single type of action. This can be a single type of database update, a report generation, etc. A DataContentHandler is a ContentHandler that takes data objects to perform its update.

Data is a simple utility class used to assist processing of data. FIG. 13 illustrates an data structure.

DataSetActionHandlers perform an update based on data, as illustrated in FIG. 13, retrieved from a data set source. The data set source is read by the DataSetActionHandler's DataSetReader. The data from this data set source is then parsed, depending on which data set name, by an associated StreamParser. There may be one StreamParser per data set name. At the time of parsing, the data DataContentHandler registered to handle that data set name may be associated with the parser. These content handlers may then be called as the parser parses through the data.

Figure 14:
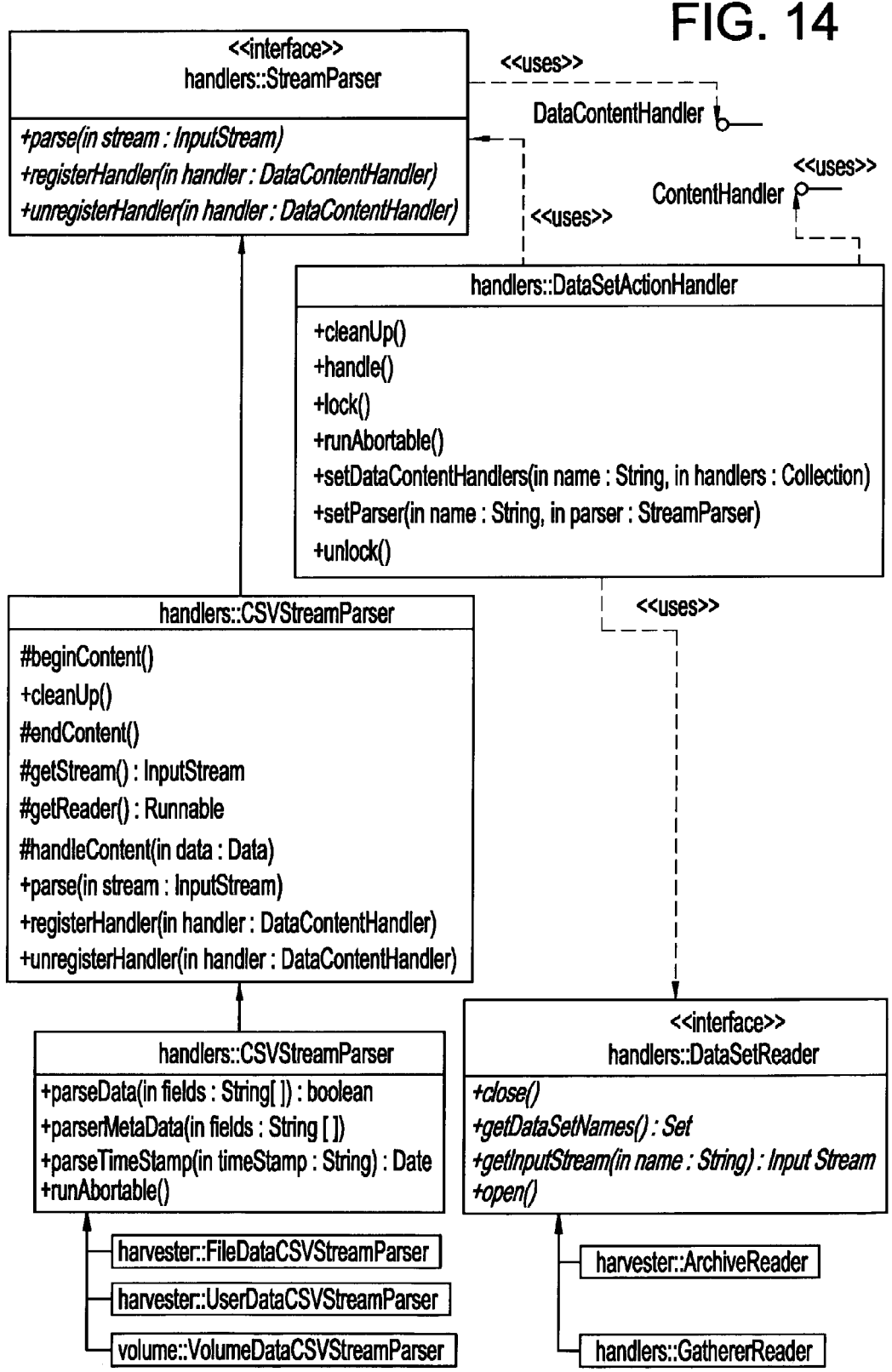
FIG. 14 is a relationship chart showing class relationships between StreamParser, AbstractStreamParser, CSVStremParser, FileDataCSVStreamParser, UserDataSCVStreamparser, VolumneDataCSVStreamParser, DataSetActionHandler, DataSetReader, ArchiveReader, and GathererReader according to an embodiment of the invention.

FIG. 14 is a relationship chart showing class relationships between StreamParser, AbstractStreamParser, CSVStremParser, FileDataCSVStreamParser, UserDataSCVStreamparser, VolumneDataCSVStreamParser, DataSetActionHandler, DataSetReader, ArchiveReader, and GathererReader.

Communication between the Harvester 4041 and other systems may be accomplished through a set of service interfaces. Each service may abstract a type of framework level service that is used by the Harvester 4041.

ConnectionService provides abstraction to a service that obtains references to commonly known objects on the SAN 200, 300 and remote systems. LoggingService provides an abstraction to a service that logs messages. EventService provides an abstraction to a service that allows sending messages to interested listeners.

Figure 15:
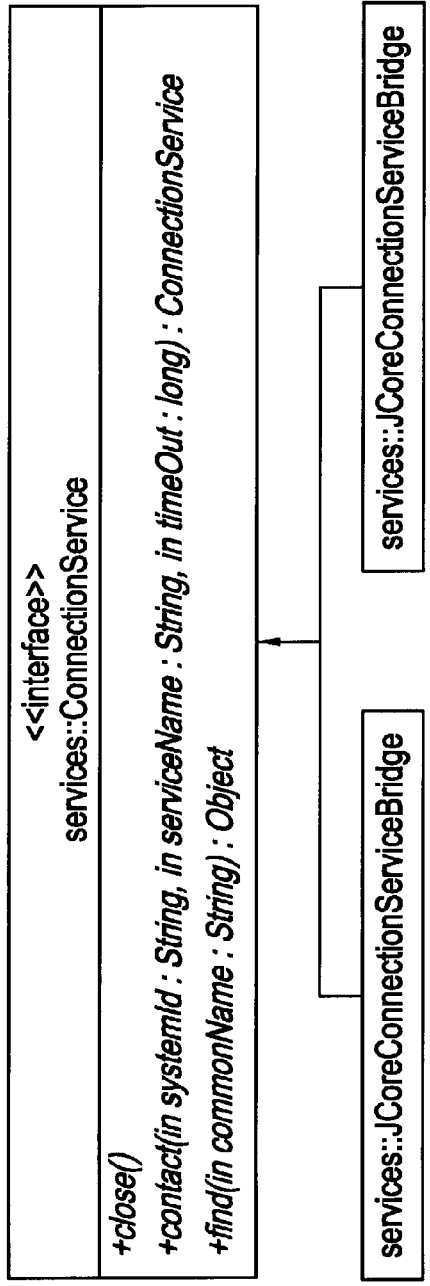
FIG. 15 is a relationship chart showing class relationships chart showing class relationships between ConnectionService, JCoreConnectionServiceBridge, and JCoreConnectionServiceBridge according to an embodiment of the invention.
Figure 16:
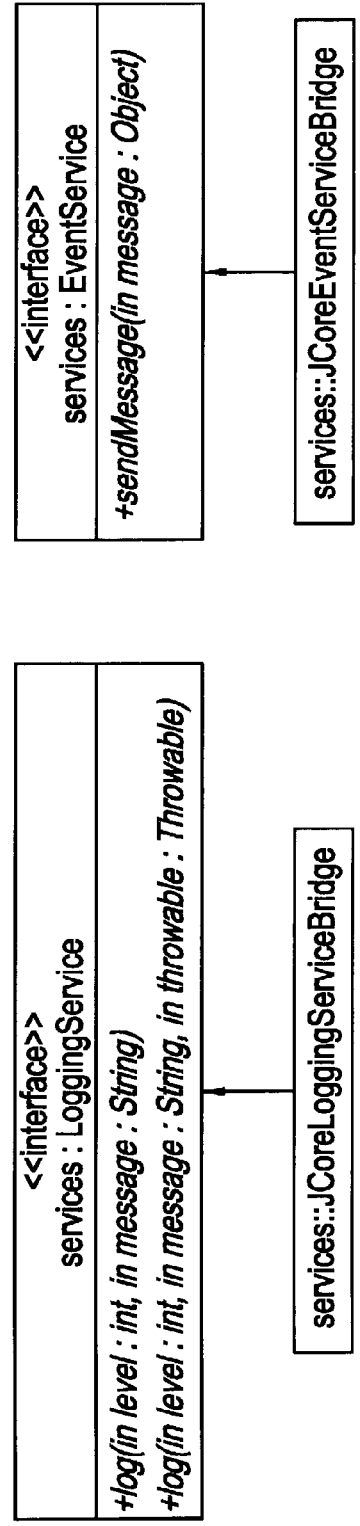
FIG. 16 is a relationship chart showing class relationships between LogginService and JCoreLoggingServiceBridge and EventService and JCoreEventServiceBridge according to an embodiment of the invention.

FIG. 15 is a relationship chart showing class relationships chart showing class relationships between ConnectionService, JCoreConnectionServiceBridge, and JCoreConnectionServiceBridge. FIG. 16 is a relationship chart showing class relationships between LogginService and JCoreLoggingServiceBridge and EventService and JCoreEventServiceBridge.

Although the embodiment of the present invention described above in conjunction with FIGS. 4-6 illustrate one Harvester 4041, as mentioned above, a Storage Builder 404 of a SAM 201, 301, may include and/or run one or more instances of the Harvester 4041 at any given time on any given individual SAM 201, 301. Additionally, as also described above, the SAN 200, 300, may include more than one SAM 201, 301. As also defined above, a set of at least one Directors 4045 and associated at least one Builder 4050 define the functionality of each Harvester 4041 instance. By defining the Storage Builder 404 with multiple instances of the Harvester 4041 with the same set of Directors 4045 and Builders 4050, enables the storage builder 404 to be easily expandable. Similarly, the presence of one or more of the Harvesters 401 is reusable for a common task, such as a repeat occurrence of the same message 502 being received. Additionally, the Harvester 4041 functionality could be hosted on one or more of the device consumers 204 instead of or in addition to one or more SAMs 201, 301 or partitioned across any combination of devices 201, 301, 204.

It is noted that the functional blocks illustrated in FIGS. 1-4 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s) either with or without carrier wave(s).

The architecture described above in conjunction with FIGS. 1-16 is capable of achieving several levels of abstraction by abstracting the purpose from the module that will actually handle it. For example, when a message is received by an SAM 201, 301, the actual Harvester 4041 need not be specifically identified to process the desired message. The architecture of the present invention may also achieve a level abstraction between an instance of the Harvester 4041 and the associated Directors 4045 and Builders 4050, in that any Director 4045 or Builder 4050 capable of handling the desired message may be assigned to process the message. A third level of abstraction may be obtained between the assigned Director 4045 and the associated Builder 4050 and the ActionHandler 4046, which is actually identified to handle the message.

One or more of these three levels of abstraction enable the message 502 which is received to be decoupled from the actual module(s) that will handle the message. These at least three levels of abstraction permit the modules of the SAM 201, 301 to be easily reusable for common tasks, allows the functionality of the SAM 201, 301 to be easily expandable and/or scalable to handle more or fewer messages, and provides an increase level of flexibility with regard to the functionality of the SAM 201, 301.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A message handling code arrangement for handling information-contributing types of messages, the message handling code being provided on a computer storage medium or media for use in a system having a bus, one or more providers of storage capability, a manager, and one or more devices connected to said bus, execution of said message handling code by one or more processors of the manager enabling data collection and processing among the one or more providers of storage capability and the one or more devices, the message handling code comprising:

a harvester code portion for accumulating at least one message that includes data collected from at least one of the one or more providers of storage capability in the system, the collected data including information indicative as to utilization of the storage capability, respectively, determining what processing the at least one message requires, in response to a determination that the at least one message corresponds to a configuration that at least one director is configured to handle, constructing at least one generic actionhandler to process the at least one message using the at least one director and at least one associated builder, and executing the at least one generic actionhandler to perform a desired action, and in response to a determination that the at least one message corresponds to a configuration that the at least one director is configured to handle, processing the message without construction of the at least one generic actionhandler and said harvester code portion receiving the at least one message from a messenger code portion, said harvester code portion querying the at least one director to determine if the at least one message is of interest, and if the at least one message is of interest to the at least one director, the at least one director generating the at least one generic actionhandler by examining the at least one builder, said harvester code portion executing the at least one generic actionhandler using one of a taskqueue and a transactionqueue to perform the desired action on the at least one message.

2. The message handling code arrangement of claim 1, said harvester code portion further querying the at least one director to determine any appropriate actionhandlers, accumulating all appropriate actionhandlers for a given message, and using the at least one associated builders to construct an appropriate set of actionhandlers.

3. The message handling code arrangement of claim 1, wherein after said harvester code portion executes the at least one actionhandler, said harvester code portion obtains a list of unhandled messages that are output via an eventservice to other messenger code portions that may be able to handle the unhandled messages on said list.

4. The message handling code arrangement of claim 1, wherein said harvester code portion is configured to adhere to a distributed computing technology.

5. A message handling code arrangement for handling information-contributing types of messages, the message handling code being provided on a computer storage medium or media for use in a system having a bus, one or more providers of storage capability, a manager, and one or more devices connected to said bus, execution of said message handling code by one or more processors of the manager enabling data collection and processing among the one or more providers of storage capability and the one or more devices, the message handling code comprising:
    a connection code portion for doing at least the following:
        accumulating at least one message that includes data collected from at least one of the one or more providers of storage capability in the system, the collected data including information indicative as to utilization of the storage capability, respectively, and
        placing the at least one message in at least one queue; and
    a work thread queuing code portion for taking a message from the at least one queue and querying at least one director for any possible actionhandlers that are capable of handling the message, the at least one director defining capabilities of the work thread queuing code portion; the possible actionhandlers accessing one or more devices connected to said bus, acting as a database, wherein the possible actionhandlers are created in response to a determination that the at least one director is configured to handle the at least one message, and wherein the at least one message is handled without creation of the possible actionhandlers in response to a determination that the at least one director is not configured to handle the at least one message and said work thread queuing code portion querying the at least one director to determine if the at least one message is of interest, and if the at least one message is of interest to the at least one director, the at least one director generating the at least one possible actionhandler by examining the at least one associated builder, said work thread queuing code portion executing the at least one possible action handler using the at least one queue to perform the desired action on the at least one message.

6. The message handling code arrangement of claim 5, said work thread queuing code portion further querying the at least one director to determine any appropriate actionhandlers, accumulating all appropriate actionhandlers for a given message, and using at least one builder associated with the at least one director to construct an appropriate set of actionhandlers.

7. The message handling code arrangement of claim 5, wherein after said work thread queuing code portion executes the at least one actionhandler, said work thread queuing code portion obtains a list of unhandled messages that are output via an eventservice to other messenger code portions that may be able to handle the unhandled messages on said list.

8. The message handling code arrangement of claim 5, wherein said connection code portion and said work thread queuing code portion are configured to adhere to a distributed computing technology.

9. A management apparatus including a processor operatively coupled to a system having a bus, one or more providers of storage capability, and one or more devices connected to said bus, said management apparatus enabling data collection and processing among the one or more providers of storage capability and the one or more devices, said management apparatus comprising:
    at least one harvester for doing at least the following:
        accumulating at least one information-contributing type of message that includes data collected from at least one of the one or more providers of storage capability in the system, the collected data including information indicative as to utilization of the storage capability, respectively,
        determining what processing the at least one message requires,
        in response to a determination that the at least one message corresponds to a configuration that at least one director is configured to handle, constructing at least one generic actionhandler to process the at least one message using at least one director and at least one associated builder, and
        executing the at least one actionhandler to perform a desired action, wherein in response to a determination that the at least one message corresponds to a configuration that the at least one director is configured to handle, processing the message without construction of the at least one generic actionhandler and the at least one harvester receiving the at least one message from a messenger, said at least one harvester querying the at least one director to determine if the at least one message is of interest, and if the at least one message is of interest to the at least one director, the at least one director generating the at least one actionhandler by examining the at least one builder, said at least one harvester executing the at least one action handler using one of a taskqueue and a transaction queue to perform the desired action on the at least one message.

10. The management apparatus of claim 9, said at least one harvester further querying the at least one director to determine any appropriate actionhandlers, accumulating all appropriate actionhandlers for a given message, and using the at least one associated builders to construct an appropriate set of actionhandlers.

11. The management apparatus of claim 9, wherein after said at least one harvester executes the at least one actionhandler, said at least one harvester obtains a list of unhandled messages that are output via an eventservice to other messenger code portions that may be able to handle the unhandled messages on said list.

12. The management apparatus of claim 9, said at least one director including a plurality of directors and/or said at least one harvester including a plurality of harvesters.

13. A management apparatus operatively coupled to a system having a bus, one or more providers of storage capability, and one or more devices connected to said bus, said management apparatus enabling data collection and processing among the one or more providers of storage capability and the one or more devices, said management apparatus comprising:
at least one messenger for doing at least the following:
accumulating at least one information-contributing type of message that includes data collected from at least one of the one or more providers of storage capability in the system, the collected data including information indicative as to utilization of the storage capability, respectively, and
placing the at least one message in at least one queue; and
at least one work thread processor for taking a message from the at least one queue and querying at least one director for any possible actionhandlers that are capable of handling the message, the at least one director defining capabilities of the at least one work thread processor;
the possible actionhandlers accessing one or more devices connected to said bus, acting as a database, wherein the possible actionhandlers are created in response to a determination that the at least one director is configured to handle the at least one message, and wherein the at least one message is handled without creation of the possible actionhandlers in response to a determination that the at least one director is not configured to handle the at least one message and said at least one work thread processor querying the at least one director to determine if the at least one message is of interest, and if the at least one message is of interest to the at least one director, the at least one director generating the at least one possible actionhandler by examining the at least one associated builder, said at least one work thread processor executing the at least one possible actionhandler using the at least one queue to perform the desired action on the at least one message.

14. The management apparatus of claim 13, said at least one work thread processor further querying the at least one director to determine any appropriate actionhandlers, accumulating all appropriate actionhandlers for a given message, and using at least one builder associated with the at least one director to construct an appropriate set of actionhandlers.

15. The management apparatus of claim 13, wherein after said at least one work thread processor executes the at least one actionhandler, said at least one work thread processor obtains a list of unhandled messages that are output via an eventservice to other messenger code portions that may be able to handle the unhandled messages on said list.

16. The management apparatus of claim 13, said at least one director including a plurality of directors and/or said at least one work thread processor including a plurality of work thread processors.

17. A method of message collecting and processing, the method comprising:
accumulating at least one information-contributing type of message that includes data collected from at least one provider of storage capability, the collected data including information indicative as to utilization of the storage capability, respectively;
determining what processing the at least one message requires;
in response to a determination that the at least one message corresponds to a configuration that at least one director is configured to handle, constructing at least one generic actionhandler to process the at least one message using at least one director and at least one associated builder wherein said constructing further includes:
querying the at least one director to determine if the at least one message is of interest, and if the at least one message is of interest to the at least one director, the at least one director generating the at least one actionhandler by examining the at least one builder, and executing the at least one actionhandler using one of a taskqueue and a transaction queue to perform the desired action on the at least one message; and
executing the at least one actionhandler to perform a desired action, wherein in response to a determination that the at least one message corresponds to a configuration that the at least one director is configured to handle, processing the message without construction of the at least one generic actionhandler.

18. The method of claim 17, said constructing further including: querying the at least one director to determine any appropriate actionhandlers; accumulating all appropriate actionhandlers for a given message; and using the at least one associated builders to construct an appropriate set of actionhandlers.

19. The method of claim 17, wherein after executing the at least one actionhandler, said method obtains a list of unhandled messages that are output via an eventservice to other messenger code portions that may be able to handle the unhandled messages on said list.

20. The method of claim 17, wherein said constructing is performed by a plurality of directors and/or a plurality of harvesters.

21. An apparatus operable to perform the method of claim 17.

22. A computer storage readable medium having code portions embodied thereon that, when read by a processor, cause said processor to perform the method of claim 17.

23. The computer storage medium of claim 22, wherein said code portions are configured to adhere to a distributed computing technology.

24. A method of message collecting and processing, the method comprising:
accumulating at least one information-contributing type of message that includes data collected from at least one provider of storage capability, the collected data including information indicative as to utilization of the storage capability, respectively;
placing the at least one message in at least one queue; and
taking a message from the at least one queue and querying at least one director for any possible actionhandlers that are capable of handling the message wherein said querying further including:

querying the at least one director to determine if the at least one message is of interest, and if the at least one message is of interest to the at least one director, the at least one director generating the at least one actionhandler by examining the at least one builder, and executing the at least one actionhandler using one of a taskqueue and a transaction queue to perform the desired action on the at least one message; and accessing one or more devices connected to a bus, acting as a database, wherein the possible actionhandlers are created in response to a determination that the at least one director is configured to handle the at least one message, and wherein the at least one message is handled without creation of the possible actionhandlers in response to a determination that the at least one director is not configured to handle the at least one message.

25. The method of claim 24, said querying further including:

accumulating all appropriate actionhandlers for a given message; and using at least one associated builder to construct an appropriate set of actionhandlers.

26. The method of claim 24, wherein after executing the at least one actionhandler, said method obtains a list of unhandled messages that are output via an eventservice to other messenger code portions that may be able to handle the unhandled messages on said list.

27. The method of claim 24, wherein said querying is performed by a plurality of directors and/or a plurality of harvesters.

28. An apparatus operable to perform the method of claim 24.

29. A computer storage medium having code portions embodied thereon that, when read by a processor, cause said processor to perform the method of claim 24.

30. The computer storage medium of claim 29, wherein said code portions are configured to adhere to a distributed computing technology technology.

* * * * *

UNITED STATES PATENT AND TRADEMARK OFFICE
CERTIFICATE OF CORRECTION

| | | |
|---|---|---|
| PATENT NO. | : 7,478,398 B2 | Page 1 of 2 |
| APPLICATION NO. | : 10/284367 | |
| DATED | : January 13, 2009 | |
| INVENTOR(S) | : Terry Robison | |

It is certified that error appears in the above-identified patent and that said Letters Patent is hereby corrected as shown below:

In column 10, line 61, in Claim 1, delete "or media" before "for".

In column 11, line 47, in Claim 5, delete "or media" before "for".

In column 12, line 16, in Claim 5, delete "action handler" and insert -- actionhandler --, therefor.

In column 13, line 3, in Claim 9, delete "action handler" and insert -- actionhandler --, therefor.

In column 13, line 4, in Claim 9, delete "transaction queue" and insert -- transactionqueue --, therefor.

In column 14, line 19, in Claim 17, after "builder" insert -- , --.

In column 14, line 27, in Claim 17, delete "transaction queue" and insert -- transactionqueue --, therefor.

In column 14, line 50, in Claim 22, after "storage" delete "readable".

In column 14, line 66, in Claim 24, after "message" insert -- , --.

In column 15, line 7, in Claim 24, delete "transaction queue" and insert -- transactionqueue --, therefor.

UNITED STATES PATENT AND TRADEMARK OFFICE
CERTIFICATE OF CORRECTION

| | |
|---|---|
| PATENT NO. | : 7,478,398 B2 |
| APPLICATION NO. | : 10/284367 |
| DATED | : January 13, 2009 |
| INVENTOR(S) | : Terry Robison |

It is certified that error appears in the above-identified patent and that said Letters Patent is hereby corrected as shown below:

In column 16, line 18, in Claim 30, after "computing technology" delete "technology".

Signed and Sealed this

Twenty-eighth Day of July, 2009

JOHN DOLL
*Acting Director of the United States Patent and Trademark Office*